United States Patent
Fujimoto

(10) Patent No.: US 8,233,244 B2
(45) Date of Patent: Jul. 31, 2012

(54) MAGNETIC HEAD SUSPENSION WITH A SUPPORTING PART THAT HAS CONNECTING BEAMS

(75) Inventor: Yasuo Fujimoto, Kyoto-fu (JP)

(73) Assignee: Suncall Corporation, Kyoto-Fu (JP)

( * ) Notice: Subject to any disclaimer, the term of this patent is extended or adjusted under 35 U.S.C. 154(b) by 187 days.

(21) Appl. No.: 12/766,453

(22) Filed: Apr. 23, 2010

(65) Prior Publication Data

US 2010/0271732 A1 Oct. 28, 2010

(30) Foreign Application Priority Data

Apr. 24, 2009 (JP) ................................. 2009-105761

(51) Int. Cl.
*G11B 5/56* (2006.01)
(52) U.S. Cl. .................................................. 360/294.4
(58) Field of Classification Search ................ 360/294.4
See application file for complete search history.

(56) References Cited

U.S. PATENT DOCUMENTS

| 6,134,087 | A | 10/2000 | Khan et al. | |
| 6,239,953 | B1 * | 5/2001 | Mei .............................. | 360/294.6 |
| 7,167,344 | B2 * | 1/2007 | Nakagawa et al. ......... | 360/294.4 |

FOREIGN PATENT DOCUMENTS

| JP | 02-227886 | 9/1990 |
| JP | 11-016311 | 1/1999 |
| JP | 2001-307442 | 11/2001 |
| JP | 2002-050140 A | 2/2002 |
| JP | 2002-093086 A | 3/2002 |

* cited by examiner

*Primary Examiner* — Allen Heinz
(74) *Attorney, Agent, or Firm* — Sterne, Kessler, Goldstein & Fox PLLC

(57) ABSTRACT

In a magnetic head suspension according to the present invention, each of paired right and left connecting beams that are positioned on both sides in a suspension width direction of an open section, with which piezoelectric elements are at least partially overlapped in a plan view, and connect a proximal end section directly or indirectly connected to a main actuator and a distal end section to which a load bending part is connected includes a convex portion projecting in a thickness direction that is perpendicular to the disk surface. The configuration makes it possible to improve the impact resistance and raise the resonance frequency of a magnetic head suspension capable of performing micro motion of a magnetic head slider by the piezoelectric elements.

9 Claims, 10 Drawing Sheets

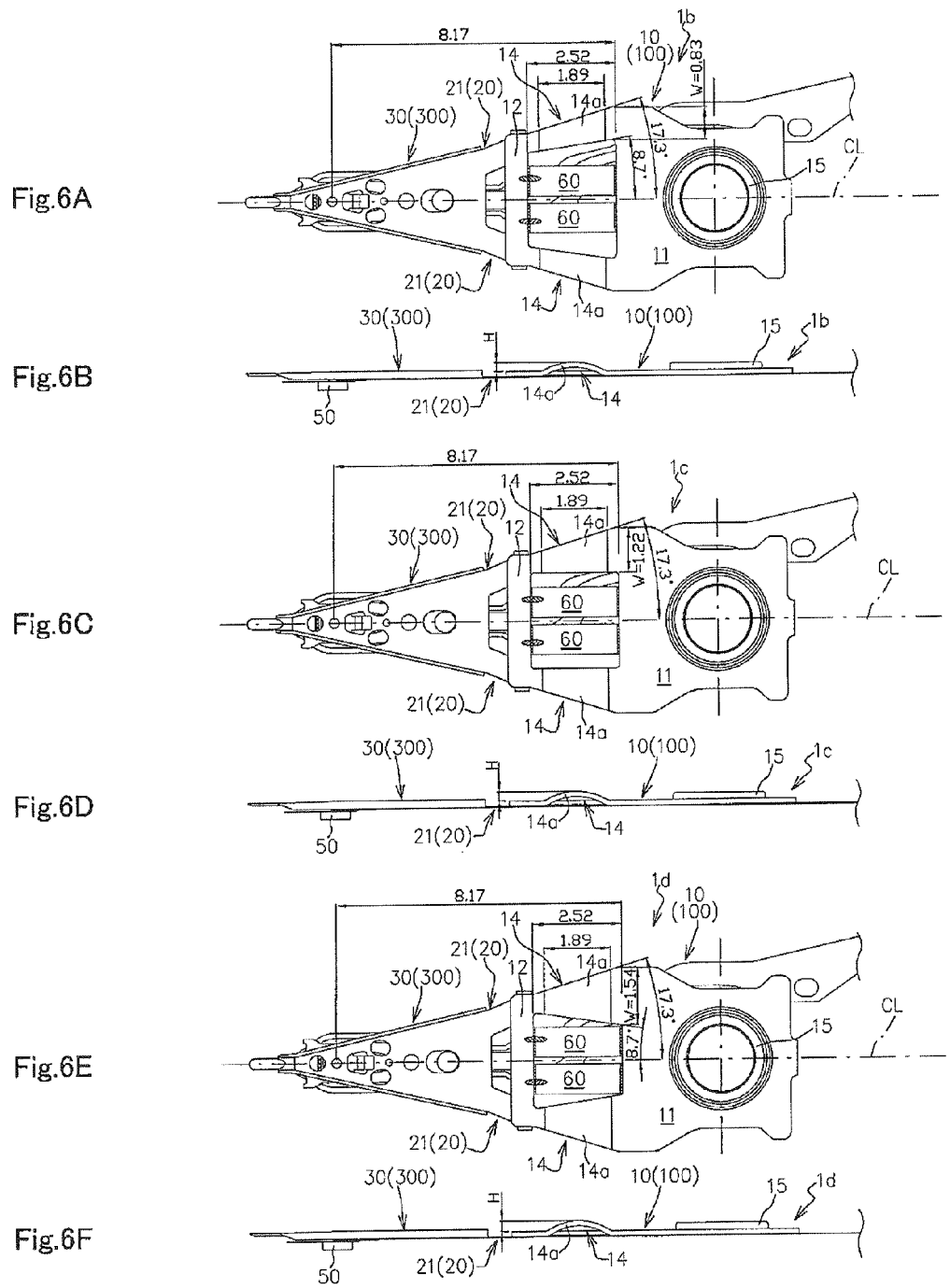

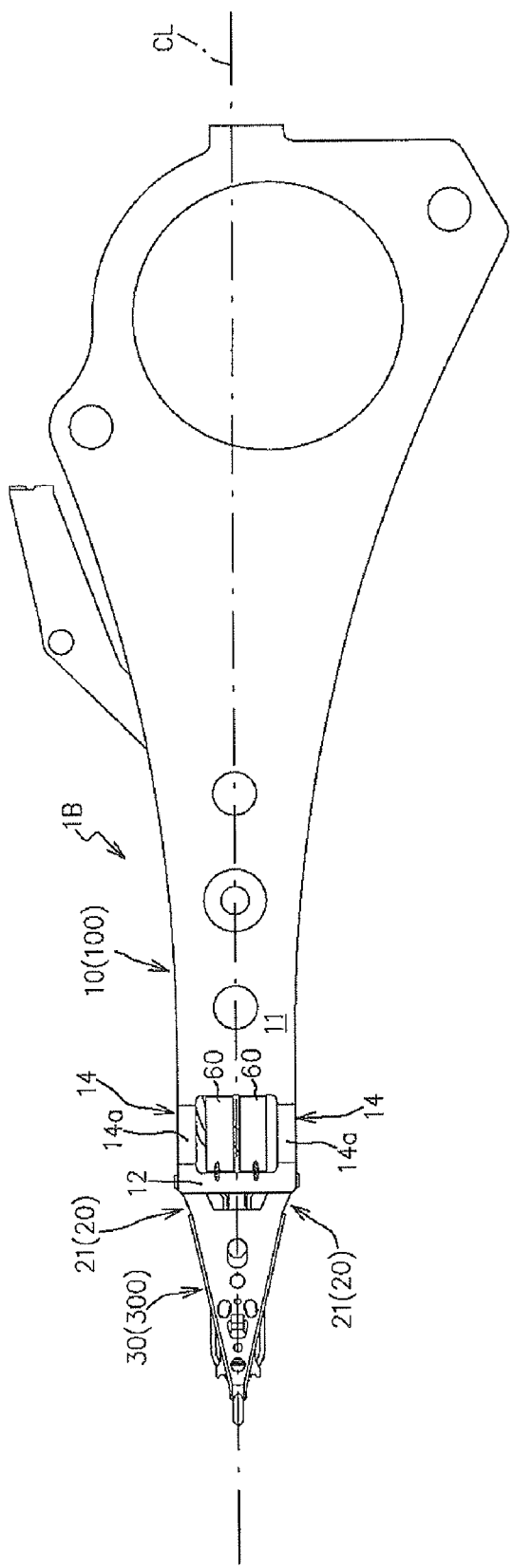

MAGNETIC HEAD SUSPENSION WITH A SUPPORTING PART THAT HAS CONNECTING BEAMS

BACKGROUND OF THE INVENTION

1. Field of the Invention

The present invention relates to a magnetic head suspension for supporting a magnetic head slider that reads and/or writes data from and to a recording medium such as a hard disk drive.

2. Related Art

Increase in capacity of a magnetic disk device requires improvement in accuracy for positioning a magnetic head slider on a target track. In this regard, there has been proposed a magnetic head suspension that enables coarse motion of a magnetic head slider in a seek direction by a main actuator such as a voice coil motor as well as micro motion of the magnetic head slider in the seek direction by piezoelectric elements functioning as a sub actuator (for example, see Japanese Unexamined Patent Application Publications No. H02-227886, No. H11-016311, and No. 2001-307442).

The magnetic head suspension including the piezoelectric elements as described above needs to be provided with a less rigid region in a supporting part that is swung directly or indirectly by the main actuator such as a voice coil motor in order to realize the micro motion of the magnetic head slider by the piezoelectric elements.

More specifically, the magnetic head suspension provided with the piezoelectric elements includes a load bending part that generates a load for pressing the magnetic head slider toward a disk surface, a load beam part that transmits the load to the magnetic head slider, the supporting part that supports the load beam part via the load bending part and is swung about a swing center directly or indirectly by the main actuator, a flexure part that is supported by the load beam part and the supporting part while supporting the magnetic head slider, and the piezoelectric elements that are attached to the supporting part.

The supporting part is provided with a proximal end region that is connected directly or indirectly to the main actuator, a distal end region to which the load bending part is connected, and the less rigid region that connects the proximal end region and the distal end region with each other. The micro motion of the magnetic head slider is realized by elastic deformation of the less rigid region in response to expansion and contraction motion of the piezoelectric elements.

In a case where the rigidity is reduced in the less rigid region, the magnetic head slider can be more easily displaced in the seek direction (in a radial direction in parallel with the disk surface) by the piezoelectric elements. On the other hand, such reduction in rigidity of the less rigid region increases a stress applied to the piezoelectric elements upon reception of an impact force by a magnetic disk device that is provided with the magnetic head suspension, and also lowers the resonance frequency of the magnetic head suspension.

SUMMARY OF THE INVENTION

The present invention has been achieved in view of the above conventional art, and it is a first object thereof to provide a magnetic head suspension that enables coarse motion of a magnetic head slider by a main actuator as well as micro motion of the magnetic head slider by piezoelectric elements, the magnetic head suspension capable of reducing a stress applied to the piezoelectric elements upon reception of an impact force while raising the resonance frequency.

In order to achieve the first object, the present invention provides a magnetic head suspension including a load bending part that generates a load for pressing a magnetic head slider toward a disk surface, a load beam part that transmits the load to the magnetic head slider, a supporting part that supports the load beam part via the load bending part and is swung about a swing center directly or indirectly by a main actuator, a flexure part that is supported by the load beam part and the supporting part while supporting the magnetic head slider, and paired right and left piezoelectric elements that are attached to the supporting part so as to be symmetrical with each other with respect to a suspension longitudinal center line and have expansion and contraction directions different from each other, in order to enable micro motion of the magnetic head slider in a seek direction, wherein the supporting part includes a proximal end section that is directly or indirectly connected to the main actuator, a distal end section to which the load bending part is connected, an open section that is positioned between the proximal end section and the distal end section in a suspension longitudinal direction, and paired right and left connecting beams that are positioned on both sides of the open section in a suspension width direction and connect the proximal end section and the distal end section, wherein each of the paired piezoelectric elements has proximal and distal ends that are connected to the proximal end section and the distal end section, respectively, while being at least partially overlapped with the open section in a plan view as viewed along a direction perpendicular to the disk surface, and wherein each of the paired connecting beams includes a convex portion projecting in a thickness direction that is perpendicular to the disk surface.

In the magnetic head suspension according to the present invention, each of the paired piezoelectric elements is mounted to the supporting part so as to have the proximal and distal ends that are connected to the proximal end section and the distal end section of the supporting part, respectively, while being at least partially overlapped with the open section formed in the supporting part in a plan view, and each of the paired connecting beams provided in the supporting part so as to be positioned outside the open section in the suspension width direction and connect the proximal end section and the distal end section includes the convex portion projecting in the thickness direction that is perpendicular to the disk surface. Accordingly, the magnetic head suspension makes it possible to reduce the stress applied to the piezoelectric elements upon reception of an impact force and, at the same time, raise the resonance frequency of the magnetic head suspension while excellently maintaining easiness of displacement (hereinafter, referred to as micro motion characteristic) of the magnetic head slider in the seek direction by the paired piezoelectric elements.

Preferably, the convex portion projects in a direction away from the disk surface.

In one embodiment, the convex portion has a substantially arc shape in a side view as viewed in a direction parallel to the disk surface.

In another one embodiment, the convex portion has a substantially triangular shape in the side view as viewed in the direction parallel to the disk surface.

Preferably, each of the paired connecting beams has a width that becomes larger as it goes from a distal end that is connected to the distal end section toward a proximal end that is connected to the proximal end section.

Preferably, an outer edge in the suspension width direction of each of the paired connecting beams is inclined so as to come close to the suspension longitudinal center line as it goes from the proximal side toward the distal side.

In one embodiment, each of the paired piezoelectric elements has the proximal end connected to the proximal end section and the distal end connected to the distal end section in a state of being disposed in the open section such that an end surface on the distal end side and an end surface on the proximal end side of each of the paired piezoelectric elements are opposed at least partially to a proximal end surface of the distal end section and a distal end surface of the proximal end section, respectively.

In another one embodiment, each of the paired piezoelectric elements is arranged so as to have the distal end mounted on an upper surface of the distal end section and the proximal end mounted on an upper surface of the proximal end section in a state of straddling the open section in the suspension longitudinal direction.

For example, the supporting part may be a base plate including a boss portion to which a distal end of a carriage arm is joined by a swage processing, the carriage arm being connected to the main actuator.

Alternatively, the supporting part may be an arm that is connected to the main actuator.

BRIEF DESCRIPTION OF THE DRAWINGS

FIGS. 6A and 6B are a top view and a side view of a magnetic head suspension according to an example 2, respectively.

FIGS. 6C and 6D are a top view and a side view of a magnetic head suspension according to an example 3, respectively.

FIGS. 6E and 6F are a top view and a side view of a magnetic head suspension according to an example 4, respectively.

FIGS. 8A to 8D show a relationship between the inclined angle and the resonance frequency in the main resonance mode, a relationship between the inclined angle and the resonance frequency in the first bending mode, a relationship between the inclined angle and the resonance frequency in the first torsion mode, and a relationship between the inclined angle and the resonance frequency in the second torsion mode, respectively.

FIG. 9 is a top view of a magnetic head suspension according to a modification of the present invention.

DETAILED DESCRIPTION OF THE PREFERRED EMBODIMENTS

Hereinafter, one preferred embodiment of a magnetic head suspension according to the present invention will be described, with reference to the attached drawings.

Figure 1A:
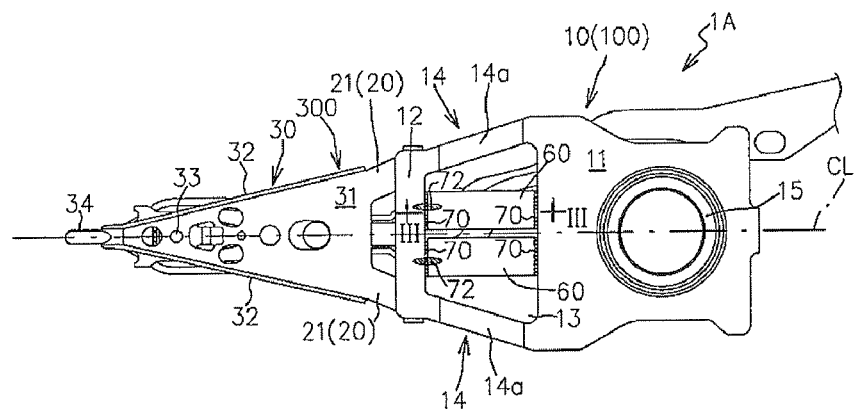
FIGS. 1A to 1C are a top view, a bottom view and a side view of a magnetic head suspension according to one embodiment of the present invention, respectively.
Figure 1B:
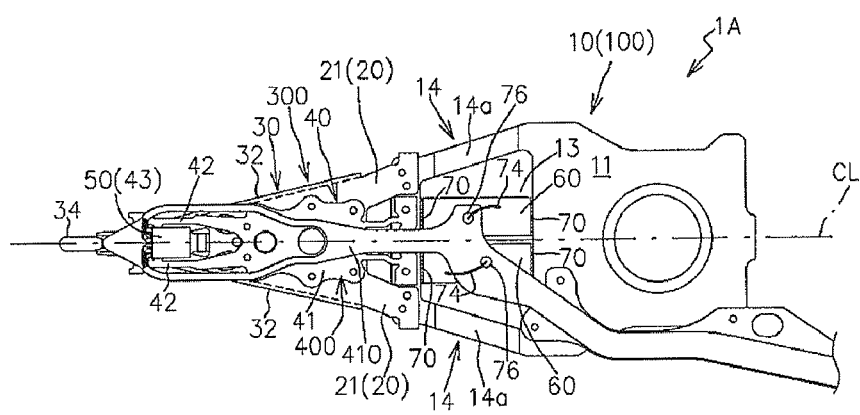
Figure 1C:
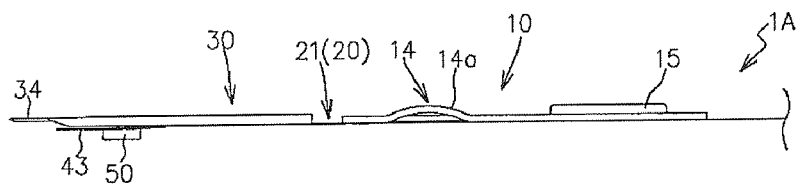

FIGS. 1A to 1C are a top view (a plan view as viewed from a side opposite from a disk surface), a bottom view (a bottom plan view as viewed from a side close to the disk surface) and a side view of a magnetic head suspension 1A according to the present embodiment, respectively. FIG. 1B indicates welding points with using small circles.

As shown in FIGS. 1A to 1C, the magnetic head suspension 1A includes a load bending part 20 that generates a load for pressing a magnetic head slider 50 toward a disk surface, a load beam part 30 that transmits the load to the magnetic head slider 50, a supporting part 10 that supports the load beam part 30 via the load bending part 20 and is swung about a swing center directly or indirectly by a main actuator, a flexure part 40 that is supported by the load beam part 30 and the supporting part 10 while supporting the magnetic head slider 50, and paired right and left piezoelectric elements 60 that are attached to the supporting part 10 so as to be symmetrical with each other with respect to a suspension longitudinal center line CL and have expansion and contraction directions different from each other, in order to enable micro motion of the magnetic head slider 50 in a seek direction.

The supporting part 10 is a member for supporting the load beam part 30 through the load bending part 20 while being directly or indirectly connected to the main actuator such as a voice coil motor, and is therefore made to have relatively high rigidity.

In the present embodiment, the supporting part 10 is formed as a base plate including a boss portion 15 to which a distal end of a carriage arm (not shown) is joined by a swage processing, the carriage arm being connected to the main actuator.

The supporting part 10 may be preferably made from, for example, a stainless plate having a thickness of 0.1 mm to 0.8 mm.

Figure 2:
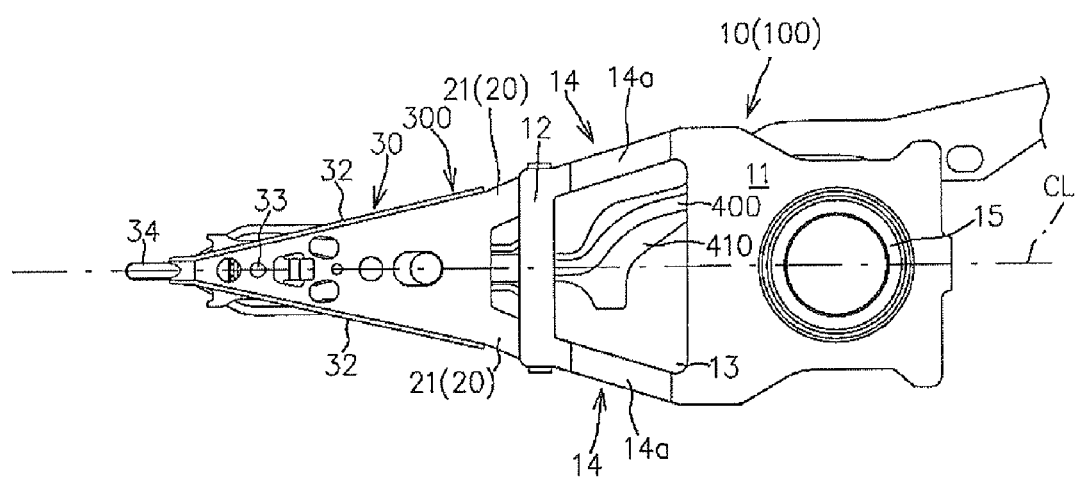
FIG. 2 is a top view of the magnetic head suspension shown in FIG. 1 in a state where paired piezoelectric elements are removed.

FIG. 2 is a top view of the magnetic head suspension 1A in a state where the paired piezoelectric elements 60 are removed.

As shown in FIGS. 1A to 1C and 2, the supporting part 10 includes a proximal end section 11 that is directly or indirectly connected to the main actuator, a distal end section 12 to which the load bending part 20 is connected, an open section 13 that is positioned between the proximal end section 11 and the distal end section 12 in a suspension longitudinal direction, and paired right and left connecting beams 14 that are positioned on both sides of the open section 13 in a suspension width direction and connect the proximal end section 11 and the distal end section 12.

Detailed configuration of the paired connecting beams 14 will be later explained.

As described above, the load beam part 30 is a member for transmitting the load generated by the load bending part 20 to the magnetic head slider 50, and therefore is required to have a predetermined rigidity.

As shown in FIGS. 1A to 1C and FIG. 2, in the present embodiment, the load beam part 30 has a plate-like main body portion 31 and flange portions 32 that are formed by being bent in a direction away from the disk surface at both sides of the main body portion 31 in the suspension width direction, and secures the rigidity by the flange portions 32.

The load beam part 30 may be made from, for example, a stainless plate having a thickness of 0.02 mm to 0.1 mm.

Specifically, the load beam part 30 is provided, at its distal end section, with a protrusion 33 that is so-called dimple.

The protrusion 33 is protruded by, for example, about 0.05 mm to 0.1 mm, in a direction toward the disk surface. The protrusion 33 is brought into contact with an upper surface (a surface opposite from the disk surface) of a head-mounting region 43 of the flexure part 40, so that the load is transmitted to the head-mounting region 43 of the flexure part 40 through the protrusion 33.

In the present embodiment, the load beam part 30 further integrally includes a lift tab 34 that extends from a distal end of the main body portion 31 toward a distal end side in the suspension longitudinal direction. The lift tab 34 is a member that engages with a lamp provided in a magnetic disk device so as to cause the magnetic head suspension 50 to be away from the disk surface in z direction (a direction perpendicular to the disk surface) at the time when the magnetic head suspension 1A is swung by the main actuator so that the magnetic head slider 50 is positioned-outward the disk surface in a radial direction.

The load bending part 20 has a proximal end connected to the supporting part 10 and a distal end connected to the load beam part 30, and generates the load for pressing the magnetic head suspension 50 toward the disk surface in accordance with its elastic deformation.

As shown in FIGS. 1A to 1C and FIG. 2, in the present embodiment, the load bending part 20 includes paired right and left leaf springs 21 that are disposed so that their plate surfaces face the disk surface.

Preferably, the paired leaf springs 21 are elastically bended in such a direction as to cause the magnetic head suspension 50 to be come close to the disk surface before the magnetic head suspension 1A is mounted to the magnetic disk device. In this case, the magnetic head suspension 1A is mounted to the magnetic disk device in a state where the paired leaf springs 21 are elastically bended back so as to generate the pressing load.

The load bending part 20 is made from a stainless steel plate of 0.02 mm to 0.1 mm thick, for example.

In the present embodiment, as shown in FIGS. 1A to 1C and FIG. 2, the load bending part 20 is integrally formed with the load beam part 30.

More specifically, the magnetic head suspension 1A according to the present embodiment includes a load beam part component 300 that integrally forms the load beam part 30 and the load bending part 20. The load beam part component 300 is welded to the supporting part 10 in a state where an upper surface of the load beam part component 300 that is poisoned on a side opposite from the disk surface is brought into contact with a lower surface, which faces the disk surface, of the distal end section 12 of the supporting part 10.

The flexure part 40 is fixed to the load beam part 30 and the supporting part 10 while supporting the magnetic head slider 50.

Specifically, the flexure part 40 includes, as shown in FIG. 1B, a body region 41 that is fixed to a lower surface of the load beam part 30 that faces the disk surface by welding or the like, paired supporting pieces 42 that extends from the body region 41 toward the distal end side, and the head-mounting region 43 that is supported by the supporting pieces 42.

The head-mounting region 43 supports the magnetic head slider 50 at a lower surface that faces the disk surface.

As described above, the protrusion 33 is brought into contact with the upper surface of the head-mounting region 43, so that the head-mounting region 43 could sway flexibly in a roll direction and in a pitch direction, with the protrusion 33 functioning as a fulcrum.

The flexure part 40 has rigidity lower than that of the load beam part 30, so that the head-mounting region 43 could sway in the roll direction and in the pitch direction.

The flexure part 40 may be preferably made from, for example, a stainless plate having a thickness of 0.01 mm to 0.025 mm.

In the present embodiment, the flexure part 40 is provided integrally with a wiring that is in the form of a printed circuit and transmits a writing signal and/or a reading signal to/from the magnetic head slider 50.

That is, the flexure part 40 has a flexure base plate 400 integrally including the body region 41, the supporting pieces 42 and the head-mounting region 43, and a flexure wiring structure 410 laminated on the flexure base plate 400.

Although the flexure wiring structure 410 is not shown in the figures, it may include an insulating layer laminated on a lower surface of the flexure base plate 400 that faces the disk surface, a conductor layer laminated on a lower surface of the insulating layer that faces the disk surface, and a cover layer enclosing the conductor layer.

In the present embodiment, as shown in FIG. 1B, the flexure base plate 400 is fixed by welding to the main body portion 31 of the load beam part 30, and the distal end section 12 and the proximal end section 11 of the supporting part 10.

Each of the piezoelectric elements 60 has a main body made of PZT (lead zirconate titanate) and paired electrode layers disposed on both ends of the main body in the thickness direction thereof.

The main body is 0.05 mm to 0.3 mm thick, for example, and the electrode layers are each made of Ag or Au so as to have a thickness from 0.05 μm to several μm.

As shown in FIG. 1A, each of the paired piezoelectric elements 60 has a proximal end connected to the proximal end section 11 and a distal end connected to the distal end section 12 in a state of being at least partially overlapped with the open section 13 in a plan view as viewed along a direction perpendicular to the disk surface. Further, the paired piezoelectric elements 60 are arranged in such a manner as that one of them expands and the other one of them contracts in accordance with application of a voltage so that the piezoelectric elements 60 function as a sub actuator for causing the magnetic head slider 50 to perform micro motion in the seek direction.

Figure 3A:
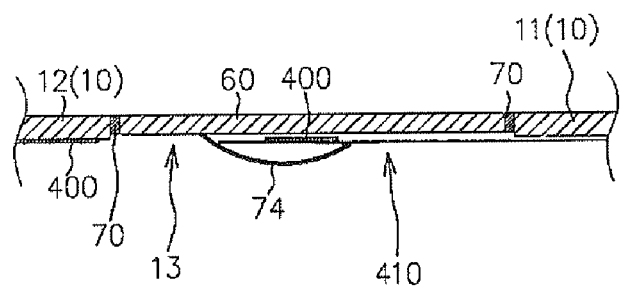
FIG. 3A is a cross sectional view taken along line III-III in FIG. 1A.

FIG. 3A is a cross sectional view taken along line III-III in FIG. 1A.

In the present embodiment, as shown in FIGS. 1A, 1B and 3A, the paired piezoelectric elements 60 are wholly disposed within the open section 13 in a plan view as viewed along the direction perpendicular to the disk surface.

More specifically, the distal ends and the proximal ends of the paired piezoelectric elements 60 are fixed to the distal end section 12 and the proximal end section 11, respectively, in a state where the paired piezoelectric elements 60 are disposed in the open section 13 such that end surfaces on the distal end sides and end surfaces on the proximal end sides of the paired piezoelectric elements 60 are opposed at least partially to a proximal end surface of the distal end section 12 and a distal end surface of the proximal end section 11, respectively.

According to the configuration, the expansion and contraction motion of the paired piezoelectric elements 60 can be transmitted as much as possible as a force for displacement of the magnetic head slider 50 in the seek direction.

Moreover, according to the above configuration, the paired piezoelectric elements 60 can be overlapped partially or entirely with the supporting part 10 in the thickness direction. Therefore, it is possible to reduce as much as possible the thickness of the entire magnetic head suspension 1A inclusive of the paired piezoelectric elements 60.

In the present embodiment, the paired piezoelectric elements 60 have the end surfaces on the distal end side that are fixed to the proximal end surfaces of the distal end section 12 by a fixing member 70 such as an insulative adhesive agent and also have the end surfaces on the proximal end side that are fixed to the distal end surface of the proximal end section 11 by the fixing member 70 such as the insulative adhesive agent in a state where the paired piezoelectric elements 60 are wholly arranged in the open section 13 in a plan view.

That is, the expansion and contraction motion of the paired piezoelectric elements 60 is transmitted to the distal end section 12 and the proximal end section 11 via the fixing members 70.

As shown in FIGS. 1A and 1B, in the present embodiment, the paired piezoelectric elements 60 are disposed such that longitudinal directions (in other words, the expansion and contraction directions) thereof are aligned along the suspension longitudinal direction. However, the present invention is not limited to such a configuration.

More specifically, the longitudinal directions of the paired piezoelectric elements 60 may be inclined with respect to the suspension longitudinal direction as long as the paired piezoelectric elements 60 are disposed symmetrically with each other with respect to the suspension longitudinal center line CL and each of the longitudinal directions of the paired piezoelectric elements 60 has an element along the suspension longitudinal direction.

Application of a voltage to the paired piezoelectric elements 60 can be made with use of the flexure wiring structure 410, for example.

In the present embodiment, in a state where the upper one (not facing the disk surface) of the electrode layer of each of the paired piezoelectric elements 60 is electrically connected to the supporting part 10 via a conductive member 72 (see FIG. 1A) such as a conductive adhesive agent so as to have a ground potential, a voltage is applied to the lower one (facing the disk surface) of the electrode layers of each of the paired piezoelectric elements 60 with use of the flexure wiring structure 410.

Preferably, as shown in FIGS. 1B and 2, the flexure part 40 is arranged so as to be partially overlapped with the paired piezoelectric elements 60 in a plan view as viewed along the direction perpendicular to the disk surface. The configuration makes it possible to easily apply voltage to the lower electrodes of the paired piezoelectric elements 60 using the flexure wiring structure 410.

In the present embodiment, as shown in FIGS. 1B and 3A, the conductor layer of the flexure wiring structure are electrically connected to the lower electrodes of the paired piezoelectric elements 60 by wire bonding.

FIG. 1B also shows an opening 76 formed at the cover layer for exposing the conductor layer.

In the present embodiment, the paired piezoelectric elements 60 are wholly disposed within the open section 13 as described above. However, the present invention is not limited to the configuration.

Figure 3B:
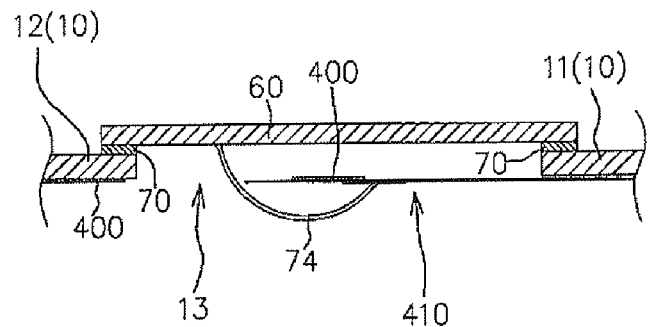
FIG. 3B is a cross sectional view of the paired piezoelectric elements that are mounted in a mounting state different from that in FIG. 3A.

Specifically, as shown in FIG. 3B, each of the paired piezoelectric elements 60 may be arranged so as to have the distal end mounted on the upper surface of the distal end section 12 and the proximal end mounted on the upper surface of the proximal end section 11 in a state of straddling the open section 13 in the suspension longitudinal direction.

The configuration shown in FIG. 3B makes it possible to facilitate fixing work of the paired piezoelectric elements 60 to the supporting part 10 although increasing the thickness in the z direction.

The configuration of the paired connecting beams 14 is now explained.

The paired connecting beams 14 are symmetrical to each other with respect to the suspension longitudinal center line CL, as shown in FIGS. 1A, 1B and 2.

Each of the connecting beams 14 has a convex portion 14a projecting in the thickness direction perpendicular to the disk surface, as shown in FIG. 1C.

According to the thus configured magnetic head suspension 1A, at the time when micro motion of the magnetic head slider 50 is made by the expansion and contraction motion of the paired piezoelectric elements 60, the connecting beams 14 are elastically deformed mainly in the direction perpendicular to the disk surface.

Accordingly, micro motion characteristic of the magnetic head slider 50 in the seek direction by the paired piezoelectric elements 60 could be enhanced.

In the present embodiment, the distal end section 12, the paired connecting beams 14 and the proximal end section 11 are integrally formed by a single member.

Specifically, a supporting part component 100 forming the supporting part 10 integrally includes a region forming the distal end section 12, a region forming the paired connecting beams 14, and a region forming a proximal end section 11.

The supporting part component 100 may be made from, for example, a plate-like base plate by pressing work.

Described below is a result of analysis that is made on the magnetic head suspension 1A in accordance with the finite element method for verification of the advantage thereof.

Figure 4A:
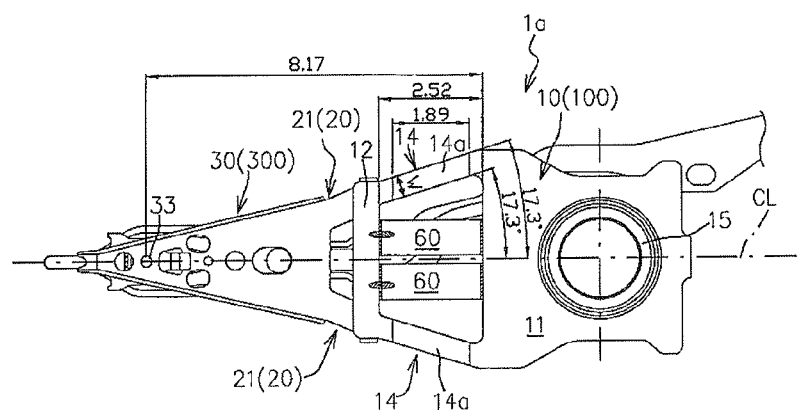
FIGS. 4A and 4B are a top view and a side view of a magnetic head suspension according to an example 1, respectively.
Figure 4B:
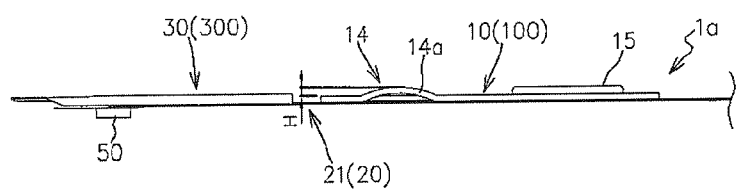

FIGS. 4A and 4B are a top view and a bottom view of a first example 1a (hereinafter, referred to as example 1) of the magnetic head suspension 1A according to the present embodiment, respectively.

In the example 1, the thicknesses of the load beam part 30, the piezoelectric element 60, the supporting part 10, the flexure base plate 400, and the flexure wiring structure 410 were set to 0.025 mm, 0.12 mm, 0.15 mm, 0.018 mm, and 0.018 mm, respectively.

Further, in the example 1, as shown in FIG. 4A, a distance in the suspension longitudinal direction between the proximal end of the connecting beam 14 and the dimple 33 was set to 8.17 mm, a length in the suspension longitudinal direction of the connecting beam 14 was set to 2.52 mm, and the connecting beam 14 was inclined so as to come close to the suspension longitudinal center line CL as it goes from the proximal end to the distal end. Both inclined angles of inner and outer edges in the suspension width direction of the connecting beam 14 with respect to the suspension longitudinal center line CL1 were set to 17.3°.

Figure 5A:
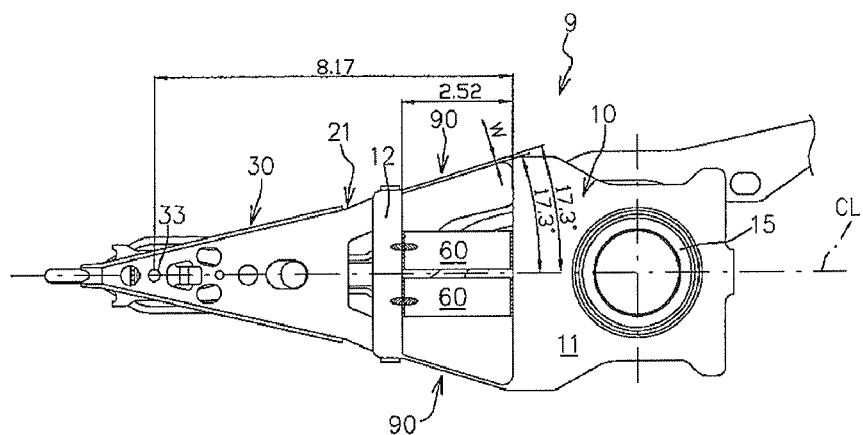
FIGS. 5A and 5B are a top view and a side view of a magnetic head suspension according to a comparative example, respectively.
Figure 5B:
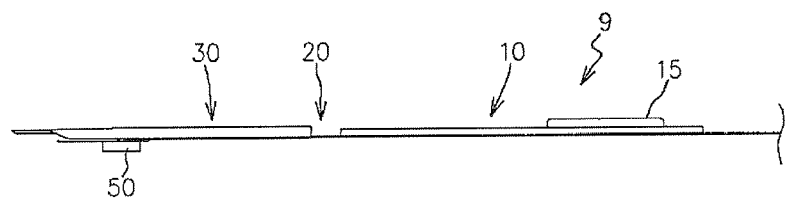

FIGS. 5A and 5B are top and side views of a conventional magnetic head suspension 9 (hereinafter referred to as comparative example) that was used in the analysis.

As shown in FIGS. 5A and 5B, the comparative example is different from the example 1 in that plate-like connecting beams 90 are provided in place of the connecting beams 14 with the convex portions 14a, and has the same dimension as the example 1 with respect to the remaining portions.

Obtained was necessary widths W of the connecting beams 14, 90 of the example 1 and the comparative example in order to equalize a predetermined micro motion characteristic.

More specifically, in the example 1 and the comparative example, there were obtained the widths W of the connecting beam 14 and the connecting beam 90 that were required to set a displacement characteristic of the magnetic head slider 50 in the seek direction in response to the voltage applied to the paired piezoelectric elements 60 to 8.3 nm/V (hereinafter, referred to as reference displacement in seek direction).

In result, in the comparative example, the width W of the connecting beam 90 needs to be narrowed to 0.08 mm in order to obtain the reference displacement in seek direction. To the contrary, in the example 1, the width W of the connecting beam 14 can be expanded to 0.53 mm while obtaining the reference displacement in seek direction in a case where a height H of the convex portion 14a being set to 0.22 mm.

According to the above, the example 1 is recognized as being capable of forming, by pressing work, a configuration with a desired micro motion characteristic easier than the comparative example in which the paired connecting beams 90 are formed into a plate-like shape.

More specifically, in order to stably form a member including a beam part by pressing work from a plate-like plate, a width of the beam part needs to be at least twice a thickness of the plate.

As described above, the paired connecting beams 14 are provided at the supporting part 10. In this analysis, the thickness of the supporting part 10 inclusive of the paired connecting beams 14 is set to 0.15 mm.

Accordingly, in order to stably form, by pressing work, the supporting part 10 inclusive of the paired connecting beams 14 under the condition for this analysis, each of the paired connecting beams 14 is required to have the width of at least 0.30 mm.

In this regard, in order to obtain the reference displacement in seek direction in the comparative example, the width W of the connecting beam 90 needs to be set to 0.08 mm that is much narrower than 0.30 mm allowing the connecting beam to be stably formed by pressing work. To the contrary, the example 1 makes it possible to obtain the reference displacement in seek direction with setting the width W of the connecting beam 14 to 0.53 mm that is wider than 0.30 mm allowing the connecting beam to be stably formed by pressing work.

FIGS. 6A and 6B are a top view and a side view of a second example 1b (hereinafter, referred to as example 2) of the magnetic head suspension according to the present embodiment.

FIGS. 6C and 6D are a top view and a side view of a third example 1c (hereinafter, referred to as example 3) of the magnetic head suspension according to the present embodiment.

FIGS. 6E and 6F are a top view and a side view of a third example 1d (hereinafter, referred to as example 4) of the magnetic head suspension according to the present embodiment.

The examples 2 to 4 are configured so that inner edges of the connecting beams 14 in the suspension width direction have inclined angles different from that in the example 1.

More specifically, in the example 2, the inclined angle of the inner edge of the connecting beam 14 in the suspension width direction with respect to the suspension longitudinal center line CL was set to 8.7°, and, as a result, the connecting beam 14 has the width W of 0.53 mm at the distal end and the width W of 0.83 mm at the proximal end.

In the example 3, the inner edge of the connecting beam 14 in the suspension width direction was substantially parallel to the suspension longitudinal center line CL (the inclined angle was set to 0°), and, as a result, the connecting beam 14 has the width W of 0.53 mm at the distal end and the width W of 1.22 mm at the proximal end.

In the example 4, the inclined angle of the inner edge of the connecting beam 14 in the suspension width direction with respect to the suspension longitudinal center line CL was set to reverse 8.7°, and, as a result, the connecting beam 14 has the width W of 0.53 mm at the distal end and the width W of 1.54 mm at the proximal end.

Heights of the convex portions 14a required to obtain the reference displacement in seek direction in the examples 2 to 4 were 0.25 mm, 0.27 mm and 0.29 mm, respectively, based on calculation.

According to the above, the desired micro motion characteristic could be obtained by making the convex portion 14a high even if the width of the connecting beam 14 is widened.

Subsequently described is a result of analysis on impact resistance of each of the examples 1 to 4 and the comparative example.

In this analysis, regarding each of the examples 1 to 4 and the comparative example, in a state where the boss portion 15 is restrained and the magnetic head slider 50 is also restrained so as not to be displaced in z direction perpendicular to the disk surface, applied to these restrained regions was a shock wave (sine half wave) having a pulse width of 1.0 msec and a peak value of 1000 G in a direction toward the disk surface, and obtained was the maximum stress caused to the paired piezoelectric elements 60.

Figure 7:
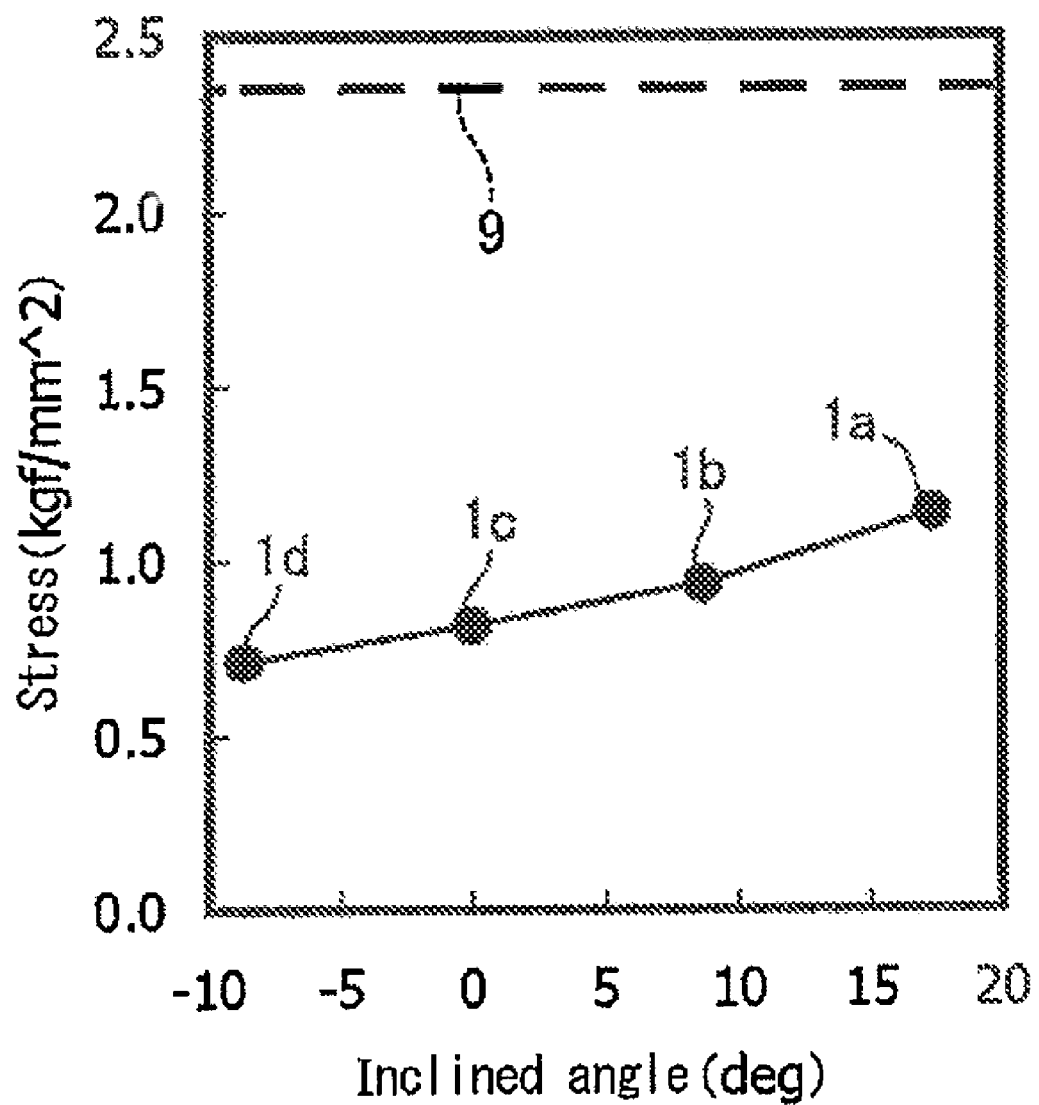
FIG. 7 is a graph showing a result of analysis performed in accordance with the finite element method for impact resistance with respect to each of the examples 1-4 and the comparative example, and shows a relationship between an inclined angle of an inner edge in the suspension width direction of a connecting beam with respect to a suspension longitudinal center line and a stress applied to the piezoelectric elements upon reception of a predetermined impact force in each of the examples.

FIG. 7 shows the result of this analysis.

Inclined angle of transverse axis in each of FIG. 7 and FIG. 8 that is later described denotes the inclined angle of the inner edge of the connecting beam 14 in the suspension width direction with respect to the suspension longitudinal center line CL.

In a case where the inclined angle has +(plus) value, the inner edge of the connecting beam 14 is inclined so as to come closer to the suspension longitudinal center line CL as it goes from the proximal side to the distal side. On the other hand, in a case where the inclined angle has – (minus) value, the inner edge of the connecting beam 14 is inclined so as to come closer to the suspension longitudinal center line CL as it goes from the distal side to the proximal side.

It is recognized from FIG. 7 that all of the examples 1 to 4 could improve impact resistance in comparison to the comparative example including the paired plane-like connecting beams 14.

Further, as shown in FIG. 7, the maximum stress caused to the paired piezoelectric elements 60 become smallest in the example 4 out of the examples 1 to 4, which means that the example 4 has the best impact resistance.

It is recognized from the fact that a configuration in which the connecting beam 14 is widened on the proximal side could improve impact resistance.

Lastly described is a result of analysis on the resonance frequencies of the examples 1 to 4 and the comparative example.

In this analysis, obtained in accordance with the eigenvalue analysis were the resonance frequencies in the main resonance mode, the first bending mode, the first torsion mode and the second torsion mode of each of the examples 1 to 4 and the comparative example.

FIGS. 8A to 8D respectively show the result of this analysis.

The main resonance mode is a vibration mode of the magnetic head suspension in the seek direction. The first bending mode is a vibration mode of bending motion of the magnetic head suspension in the z direction (perpendicular to the disk surface). The first torsion mode is a vibration mode of torsion motion of the load bending part about the suspension longitudinal center line. The second torsion mode is a vibration mode of torsion motion of the supporting part about the suspension longitudinal center line.

As seen in FIGS. 8A to 8D, the examples 1 to 4 are capable of raising the resonance frequencies in all the vibration modes including the main resonance mode, the first bending mode, the first torsion mode and the second torsion mode in comparison to the comparative example with the plate-line connecting beams 90.

Figure 8A:
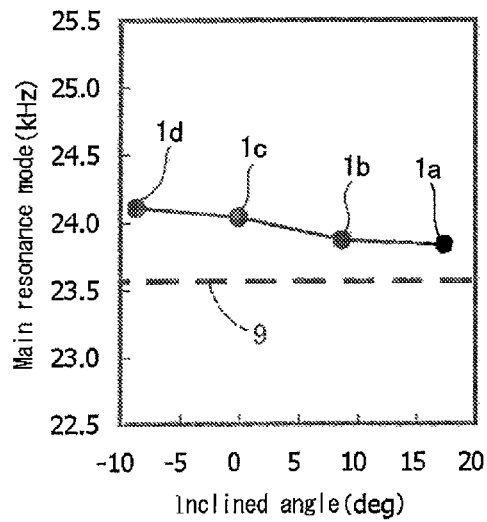
FIGS. 8A to 8D are graphs showing a result of analysis performed in accordance with the finite element method for the resonance frequency with respect to each of the examples 1-4 and the comparative example.
Figure 8B:
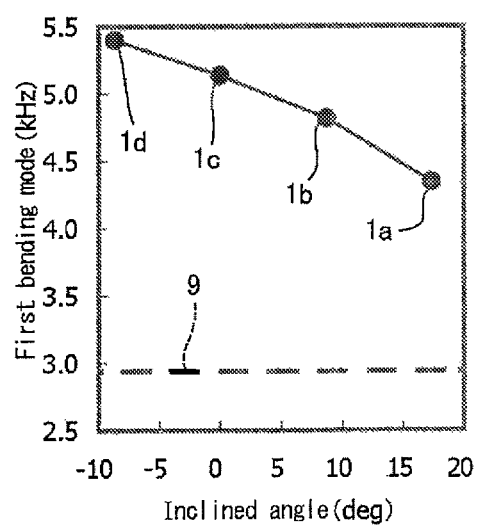
Figure 8C:
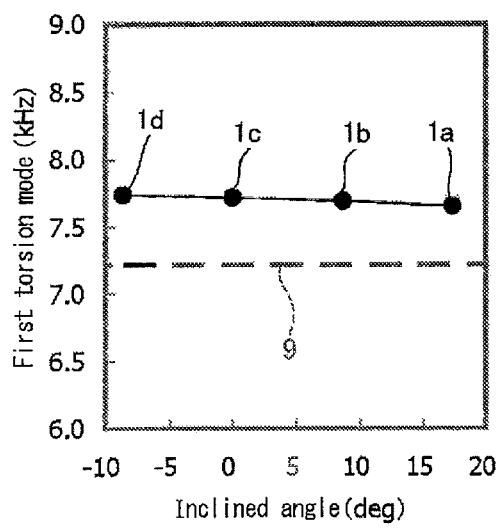
Figure 8D:
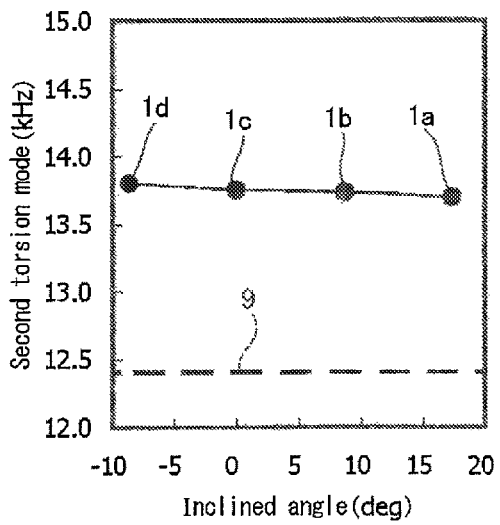

Further, as apparent from FIGS. 8A and 8B, the configuration in which the connecting beam 14 has the width that becomes wider as it goes from the distal end to the proximal end could raise the resonance frequencies in the main resonance mode and the first bending mode without worsening the resonance frequencies in the first torsion mode and the second torsion mode.

Preferably, as shown in FIG. 1, the convex portion 14a is configured to project in a direction away from the disk surface.

The preferable configuration makes it possible to prevent the convex portion 14a from coming in contact with the disk surface upon reception of an impact force.

Further, in the present embodiment, as shown in FIG. 1C, the convex portion 14a is formed into a substantially arc shape in a side view as viewed along a direction parallel to the disk surface.

The configuration makes it possible to cause the connecting beams 14 to smoothly perform elastic deformation in a direction perpendicular to the disk surface at the time when micro motion of the magnetic head suspension 50 in the seek direction by the paired piezoelectric elements 60 is made.

Figure 10:
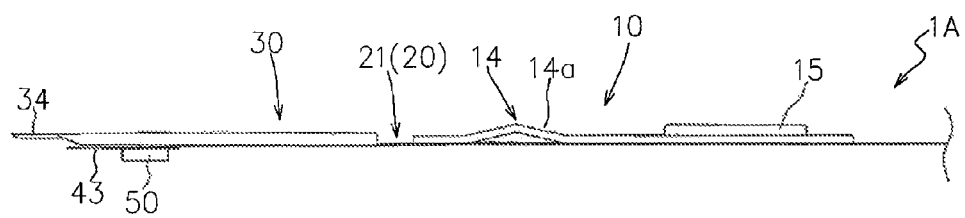
FIG. 10 is a side view of a magnetic head suspension according to another example.

Alternatively, the convex portion 14a may be formed into a substantially triangular shape in the side view, as shown in FIG. 10.

The configuration makes it possible to easily form the convex portion 14a.

In the present embodiment, the supporting part 10 is embodied by the base plate. However, it is of course that the present invention in not limited to the configuration. Specifically, the supporting part 10 may be embodied by an arm having a proximal end connected to the swing center of the main actuator.

FIG. 9 is a top view of a magnetic head suspension 1B according to a modification of the present invention in which the supporting part 10 is changed to the arm.

In the magnetic head suspension 1B shown in FIG. 9, the connecting beam 14 has inner and outer edges in the suspension width direction that are substantially parallel to the suspension longitudinal center line CL.

The configuration makes it possible to downsize (or narrow) the magnetic head suspension 1B in the suspension width direction.

What is claimed is:

1. A magnetic head suspension comprising a load bending part that generates a load for pressing a magnetic head slider toward a disk surface, a load beam part that transmits the load to the magnetic head slider, a supporting part that supports the load beam part via the load bending part and is swung about a swing center directly or indirectly by a main actuator, a flexure part that is supported by the load beam part and the supporting part while supporting the magnetic head slider, and paired right and left piezoelectric elements that are attached to the supporting part so as to be symmetrical with each other with respect to a suspension longitudinal center line and have expansion and contraction directions different from each other, in order to enable micro motion of the magnetic head slider in a seek direction, wherein the supporting part includes a proximal end section that is directly or indirectly connected to the main actuator, a distal end section to which the load bending part is connected, an open section that is positioned between the proximal end section and the distal end section in a suspension longitudinal direction, and paired right and left connecting beams that are positioned on both sides of the open section in a suspension width direction and connect the proximal end section and the distal end section, wherein each of the paired connecting beams has a width that becomes larger as it goes from a distal end that is connected to the distal end section toward a proximal end that is connected to the proximal end section, wherein each of the paired piezoelectric elements has proximal and distal ends that are connected to the proximal end section and the distal end section, respectively, while being at least partially overlapped with the open section in a plan view as viewed along a direction perpendicular to the disk surface, and wherein each of the paired connecting beams includes a convex portion projecting in a thickness direction that is perpendicular to the disk surface.

2. A magnetic head suspension according to claim 1, wherein the convex portion projects in a direction away from the disk surface.

3. A magnetic head suspension according to claim 1, wherein the convex portion has a substantially arc shape in a side view as viewed in a direction parallel to the disk surface.

4. A magnetic head suspension according to claim 1, wherein the convex portion has a substantially triangular shape in a side view as viewed in a direction parallel to the disk surface.

5. A magnetic head suspension according to claim 1, wherein the supporting part is a base plate including a boss portion to which a distal end of a carriage arm is joined by a swage processing, the carriage arm being connected to the main actuator.

6. A magnetic head suspension according to claim 1, wherein the supporting part is an arm that is connected to the main actuator.

7. A magnetic head suspension according to claim 1, wherein each of the paired piezoelectric elements has the proximal end connected to the proximal end section and the distal end connected to the distal end section in a state of being disposed in the open section such that an end surface on the distal end side and an end surface on the proximal end side of each of the paired piezoelectric elements are opposed at least partially to a proximal end surface of the distal end section and a distal end surface of the proximal end section, respectively.

8. A magnetic head suspension according to claim 1, wherein each of the paired piezoelectric elements is arranged so as to have the distal end mounted on an upper surface of the distal end section and the proximal end mounted on an upper surface of the proximal end section in a state of straddling the open section in the suspension longitudinal direction.

9. A magnetic head suspension comprising a load bending part that generates a load for pressing a magnetic head slider toward a disk surface, a load beam part that transmits the load to the magnetic head slider, a supporting part that supports the load beam part via the load bending part and is swung about a swing center directly or indirectly by a main actuator, a flexure part that is supported by the load beam part and the supporting part while supporting the magnetic head slider, and paired right and left piezoelectric elements that are attached to the supporting part so as to be symmetrical with each other with respect to a suspension longitudinal center line and have expansion and contraction directions different from each other, in order to enable micro motion of the magnetic head slider in a seek direction, wherein the supporting part includes a proximal end section that is directly or indirectly connected to the main actuator, a distal end section to which the load bending part is connected, an open section that is positioned between the proximal end section and the distal end section in a suspension longitudinal direction, and paired right and left connecting beams that are positioned on both sides of the open section in a suspension width direction and connect the proximal end section and the distal end section, wherein an outer edge in the suspension width direction of each of the paired connecting beams is inclined so as to come closer to the suspension longitudinal center line as it goes from the proximal side toward the distal side, wherein each of the paired piezoelectric elements has proximal and distal ends that are connected to the proximal end section and the distal end section, respectively, while being at least partially overlapped with the open section in a plan view as viewed along a direction perpendicular to the disk surface, and wherein each of the paired connecting beams includes a convex portion projecting in a thickness direction that is perpendicular to the disk surface.

* * * * *